United States Patent

Tateishi et al.

[11] Patent Number: 5,571,960
[45] Date of Patent: Nov. 5, 1996

[54] THROTTLE VALVE OPENING DEGREE SENSOR

[75] Inventors: Mamoru Tateishi; Shoichi Hagiwara; Hitoshi Takeuchi, all of Obu, Japan

[73] Assignee: Aisan Kogyo Kabushiki Kaisha, Aichi-ken, Japan

[21] Appl. No.: 402,950

[22] Filed: Mar. 13, 1995

[30] Foreign Application Priority Data

Apr. 8, 1994 [JP] Japan ................................. 6-071127
May 23, 1994 [JP] Japan ................................. 6-108685

[51] Int. Cl.⁶ ............................................. G01M 15/00
[52] U.S. Cl. ................................. 73/118.2; 123/337
[58] Field of Search ........................ 73/116, 118.2, 73/119 A, 119 R, 117.2, 117.3, 118.1; 123/337, 403, 531, 585

[56] References Cited

U.S. PATENT DOCUMENTS

| | | | |
|---|---|---|---|
| 4,505,151 | 3/1985 | Sauerschell et al. | 73/116 |
| 4,624,134 | 11/1986 | Nagano | 73/118.2 |
| 4,860,706 | 8/1989 | Suzuki et al. | 123/337 |
| 4,989,451 | 2/1991 | Ogawa et al. | 73/118.1 |
| 5,016,586 | 5/1991 | Imamura et al. | 123/337 |
| 5,083,455 | 1/1992 | Saito et al. | 73/118.2 |
| 5,092,296 | 3/1992 | Günter et al. | 123/337 |
| 5,188,078 | 2/1993 | Tamaki | 123/403 |

*Primary Examiner*—Richard Chilcot
*Assistant Examiner*—Eric S. McCall
*Attorney, Agent, or Firm*—Nikaido Marmelstein Murray & Oram LLP

[57] ABSTRACT

The present invention provides a throttle valve opening degree sensor for detecting the opening degree of a throttle valve used for an internal combustion engine wherein a rotor shaft capable of interlocking with a throttle valve has a cylindrical covering portion having an outer circumferential cylindrical body at the outer end, the cylindrical covering portion covering the outer end of the bearing portion exposed to the base portion of the housing and having an elastic engaging portion having cross-like splitted grooves at the top end and a square outer periphery, and the rotor has a square engaging hole capable of fitting the elastic engaging portion, the elastic engaging portion being fitted to and elastically abutted against the engaging hole thereby securing the rotor to the rotor shaft. According to the throttle valve opening degree sensor, it can prevent the deviation of the rotor from the center and enhance the accuracy for the attaching position, and provide water proofness and dust proofness for the outer end of the rotor shaft and the bearing portion.

7 Claims, 7 Drawing Sheets

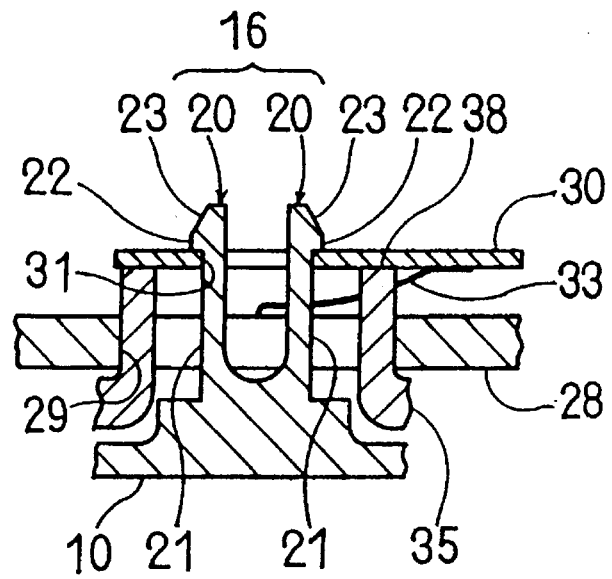
Fig. 7
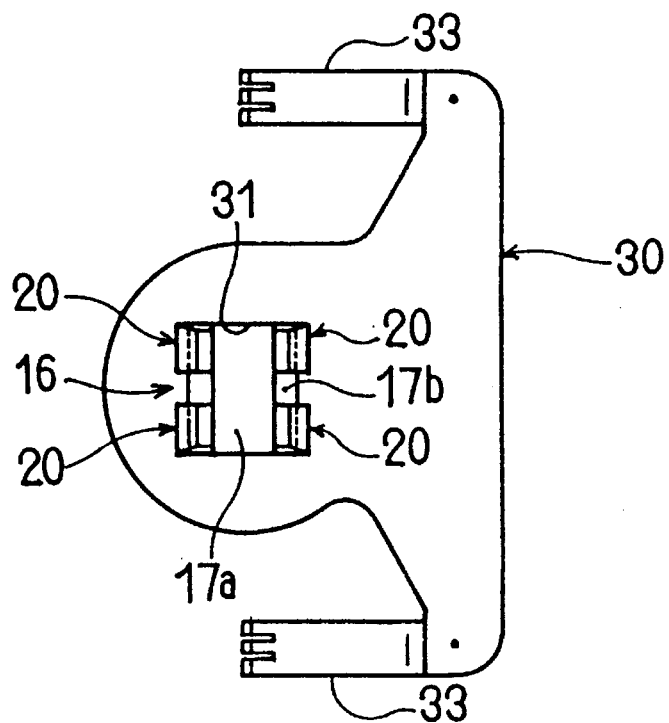

THROTTLE VALVE OPENING DEGREE SENSOR

BACKGROUND OF THE INVENTION

1. Field of the Invention

The present invention concerns a throttle valve opening degree sensor for detecting the opening degree of a throttle valve used for an internal combustion engine.

2. Description of the Prior Art

A throttle valve opening degree sensor in the prior art has been attached to a throttle body disposed in a suction system for an internal combustion engine, and adapted to actuate an opening degree detection section interlocking with a throttle valve and output an electric signal corresponding to the opening degree of the throttle valve to a control device.

The throttle valve opening degree sensor in the prior art comprises, for example, as shown by reference 50A in FIG. 1, a substrate 52 having a detection section for the opening degree of a throttle valve (not illustrated), a rotor shaft 51 which can be interlocked with the throttle valve, a rotor 53 disposed to the rotor shaft 51 and having a sliding contact 54 sliding on the opening degree detection section and a housing 55 for enhousing the substrate 52 and having a shaft bearing 57A for rotatably supporting the rotor shaft 51.

In the throttle valve opening degree sensor 50A of the above-mentioned type, the rotor shaft 51 is generally made of a metal material, and the rotor 53 is made of a metal plate or synthetic resin plate material, and a top end of the rotor shaft 51 is fitted into an elliptic hole for attachment disposed at the rotational center of the rotor 53 and the top end is subjected to spinning caulking for securing both of them.

However, in the throttle valve opening degree sensor 50A having the above-mentioned constitution, control in the X-Y direction can not be taken between the rotor and the rotor shaft upon spinning caulking, to result in a worry of causing deviation for the center and deviation for the angular position of attaching the rotor. Therefore, a position of contact is displaced between the sliding contact attached to the rotor and the opening degree detection section of the substrate, to possibly cause scattering in the detected output to result in a problem of reducing the detection accuracy.

Further, there is a worry that the rotor is deformed when it is subjected to spinning caulking and the deformation results in variation of the load of contact of the sliding contact on the opening degree detection section, to cause fluctuation in the detected output due to contact failure and localized abrasion to the opening degree detection section, thereby deteriorating the durability.

FIGS. 2, 3 show another constitution of the throttle valve opening degree sensor. For instance, the throttle valve opening degree sensor 50B shown in FIG. 2 comprises a rotor shaft 51 interlocking with a throttle shaft 61 of a throttle valve (not illustrated) disposed to a throttle body 60, a substrate 52 having an opening degree detection section for the throttle valve, a rotor 53 formed integrally with the rotor shaft 51 and having a sliding contact 54 sliding on the opening degree detection section, and a housing 55 having a housing chamber 56 for the substrate 52 and a shaft bearing portion 57B for rotatably supporting the rotor shaft 51, and a base portion 58 attached in close contact with a sensor attaching portion 63 of the throttle body 60. The rotor shaft 51 is connected with the throttle shaft 61, and the base portion 58 and the throttle body 60 are connected by means of an O-ring 59 interposed therebetween.

Further, a throttle valve opening degree sensor 50C shown in FIG. 3 (portions in common with those in FIG. 2 carry the same reference numerals for which duplicate explanation will be omitted) has a housing comprising an upper housing 55a and a lower housing 55b in which the lower housing 55b is attached in an intimate contact by way of an O-ring 59 to a sensor attaching portion 63.

In the throttle valve opening degree sensor 50B or 50C of the above-mentioned constitution, intrusion of obstacles such as water and dusts through a gap between the lower housing 55b and the sensor attaching portion 63 is shielded by the O-ring 59.

On the other hand, atmospheric air enters or leaves into and out of a space 64 at the periphery of a connection portion between the throttle shaft 61 and the rotor shaft 51 along with elevation and lowering of temperature depending on the operation conditions of an internal combustion engine (respiration) so that the obstacles intrude from a recessed groove 62 used for a control lever disposed to the throttle body 60 into the space 64 as shown by dotted chain arrows.

As a result, water intrudes through a gap between the rotor shaft 51 and a bearing portion 57B into the housing chamber 56 to cause rusting in electronic parts and deteriorate electric performance of them by moisture. Further, since the gap between the rotor shaft 51 and the bearing portion 57B is narrow, there is a problem that intrusion of the obstacles makes the rotation of the rotor 53 not smooth and, in addition, obstacles adhere to the outer end face of the rotor shaft 51 and the bearing portion 57B (rightmost end in FIGS. 2 and FIG. 3) and solidify, to bring about a problem of increasing the rotational failure of the rotor 53.

SUMMARY OF THE INVENTION

The present invention has been accomplished for overcoming the foregoing problems and an object thereof is to provide a throttle valve opening degree sensor excellent in water proofness and rust proofness and also having high durability.

Another object of the present invention is to provide a throttle valve opening degree sensor capable of preventing deviation of a rotor from the center and improving the accuracy for the angular positioning for attachment, as well as capable of attaching a rotor at a stabilized state.

A throttle valve opening degree sensor in accordance with the present invention comprises:

a rotor shaft capable of interlocking with a throttle valve disposed to a throttle body, a substrate having an opening degree detection section for the throttle valve, a rotor attached to the rotor shaft and having a sliding contact sliding on the opening degree detection section, and a housing having a housing chamber for enhousing the substrate, a bearing portion for rotatably supporting the rotor shaft and a base portion attached to the throttle body, wherein the rotor shaft has a cylindrical covering portion having an outer circumferential cylindrical body at the outer end, the cylindrical covering portion covering the outer end of the bearing portion exposed on the base portion of the housing and having, at the top end, an elastic engaging portion having cross-like slit grooves at the top end and a square outer circumference, and the rotor has a square engaging hole engageable with the elastic engaging portion, and the elastic engaging portion is fitted into and elastically abutting against the engaging hole, to secure the rotor to the rotor shaft.

In another aspect of the present invention, there is provided a throttle valve opening degree sensor comprising a substrate having an opening degree detection section for a throttle valve, a rotor shaft capable of interlocking with the throttle valve, a rotor attached to the rotor shaft and having a sliding contact sliding on the opening degree detection section, and a housing for enhousing the substrate and rotatably supporting the rotor shaft, wherein the rotor shaft has an elastic engaging portion having a cross-like slit grooves at the top end and a square outer circumference, in which the rotor has a square engaging hole engageable with the elastic engaging portion, and the elastic engaging portion is fitted into and elastically abutted against the engaging hole.

In a further aspect of the present invention, there is provided a throttle valve opening degree sensor comprising:

a rotor shaft, a substrate having an opening degree detection section for a throttle valve, a rotor attached to the rotor shaft and having a sliding contact sliding on the opening degree detection section, and a housing having a housing chamber for enhousing the substrate, a bearing portion for rotatably supporting the rotor shaft and a base portion attached to the throttle body, wherein the rotor shaft has a cylindrical covering portion having an outer circumferential cylindrical body at the outer end, the cylindrical covering port ion covering the outer end of the shaft bearing portion exposed to the base portion of the housing.

In accordance with the present invention, the elastic engaging portion of the rotor shaft has an elasticity in a direction perpendicular to each of the outer circumferential square surfaces due to the cross-like slit grooves. When the elastic engaging portion is fitted into the engaging hole of the rotor, both of them are fitted to and elastically abutted against each other, to align the axial line of the rotor shaft with the center of the rotation of the rotor. Further, the angular position for attaching the rotor can be determined by the square outer circumferential surface of the elastic engaging portion and the square engaging hole.

Further, the rotor shaft biased in one direction causes the rotor to be in an intimate contact with the rotor seat by way of protrusions of the elastic engaging portion to accurately define the position of the rotor in the axial direction.

In this way, since the elastic engaging portion having the cross-like slit grooves and a square outer circumference is disposed to the rotor shaft and a square engaging hole is disposed to the rotor, and the elastic engaging portion and the engaging hole are fitted and elastically abutted and secured to each other, it is possible to prevent the deviation of the rotor from the center and accurately position the angular attachment. Accordingly, it is possible to prevent fluctuation in the detection output of the throttle valve opening degree sensor and enhance the detection accuracy.

Further, the rotor can be attached in a stable state to the rotor shaft, which can avoid the deformation of the rotor caused upon securing the rotor and can prevent attendant fluctuation of the detection output and degradation of the durability by localized abrasion as in the prior art.

Further, the cylindrical covering port ion of the rotor shaft covers the outer end of the bearing portion to hinder the intrusions of obstacles that invade to the periphery of a connection portion between the rotor shaft and the throttle shaft from further intruding into and depositing to the bearing portion.

Further, a labyrinth-like gap formed between the cylindrical covering portion and the bearing portion inhibits intrusion of moisture and fine obstacles to the outer end of the bearing portion. Further, the annular portion outwardly scatters deposited obstacles by a centrifugal force caused by the rotation of the rotor shaft.

As has been described above, since the outer end of the bearing portion is covered with the cylindrical covering portion disposed to the rotor shaft, obstacles intruding from the outside to the connection portion between the throttle valve opening degree sensor and the throttle body from depositing to the engaging portion between the rotor shaft and the bearing portion.

Further, the labyrinth-like gap can cover the bearing portion without increasing the rotational resistance of the rotor shaft and prevent obstacles from intrusion and deposition for a long period of time. Further, the annular portion can scatter and discharge obstacles deposited thereon by the centrifugal force caused by the rotating operation of the throttle valve opening degree sensor.

Accordingly, deposition of the obstacles to the engaging portion between the rotor shaft and the bearing portion, and on the outer end face of the bearing portion can be prevented to provide high durability excellent in water proofness and dust proofness.

BRIEF DESCRIPTION OF THE DRAWINGS

FIG. 7 is an enlarged cross sectional view illustrating fitting between a rotor shaft and a rotor;

FIG. 8 is a plan view of FIG. 7; and

DESCRIPTION OF THE PREFERRED EMBODIMENTS

Figure 1:
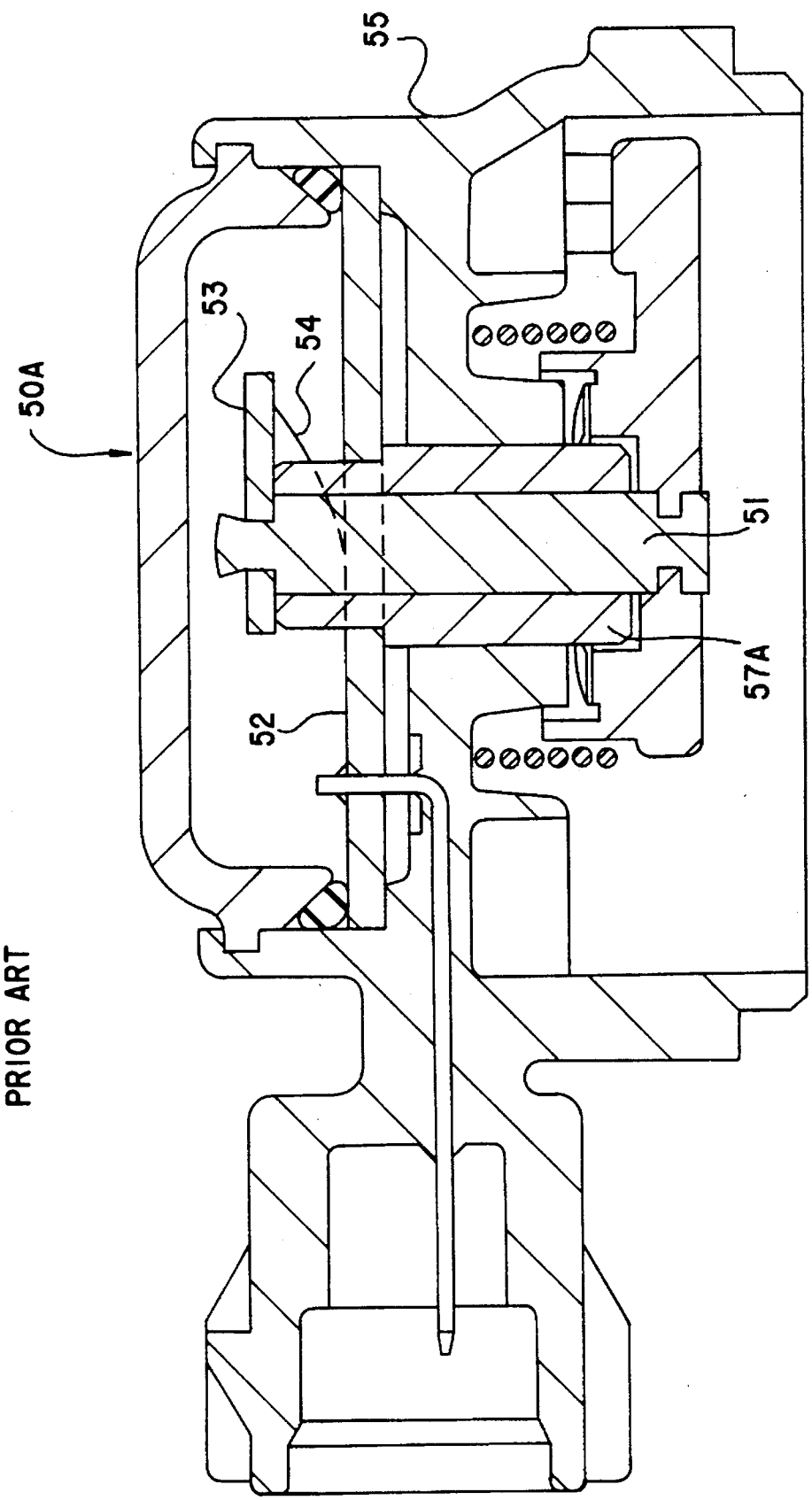
FIG. 1 is a cross sectional view illustrating an embodiment of a throttle valve opening degree sensor of the prior art.
Figure 2:
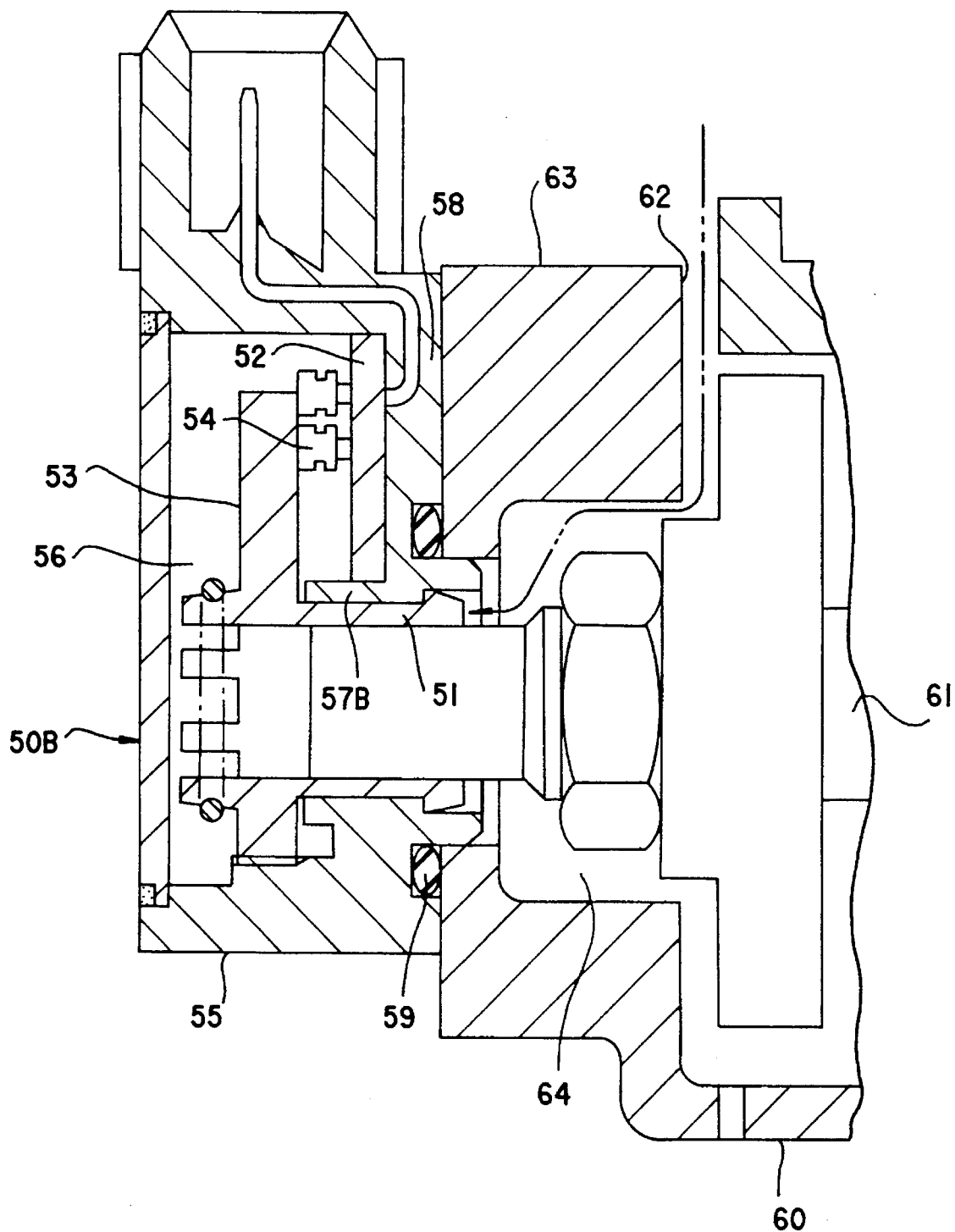
FIG. 2 is a cross sectional view illustrating an embodiment of a throttle valve opening degree sensor and a throttle body in the prior art.
Figure 3:
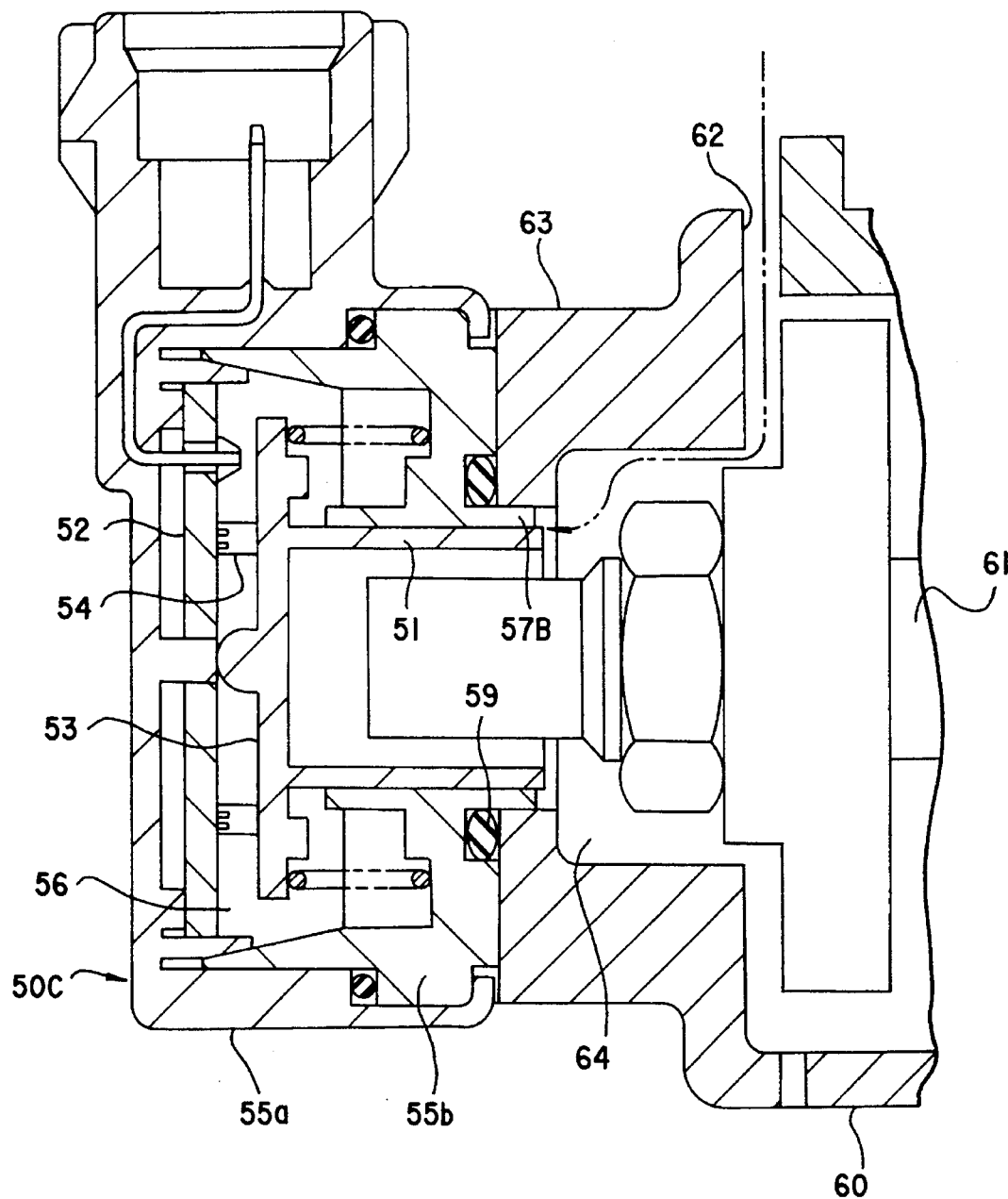
FIG. 3 is a cross sectional view illustrating another embodiment of a throttle valve opening degree sensor and a throttle body in the prior art.

Description will be made to preferred embodiments according to the present invention with reference to the drawings.

In the drawing, a throttle valve opening degree sensor denoted by reference numeral 1 comprises a rotor shaft 10, a substrate 28 having an opening degree detection section (not illustrated), a rotor 30 mounted to the rotor shaft 10 and having a sliding contact 33 sliding on the opening degree detection section, and a housing 35 having a housing chamber 36 and a bearing portion 40, and a base portion 39 attached to a sensor attaching portion 63 of a throttle body 60. The rotor shaft 10 comprises a cylindrical covering portion 11 having an outer circumferential cylindrical body 12 for covering the outer end of the bearing portion 40 and having an elastic engaging portion 16 of a square outer periphery, while the rotor 30 comprises a square engaging hole 31.

Figure 4:
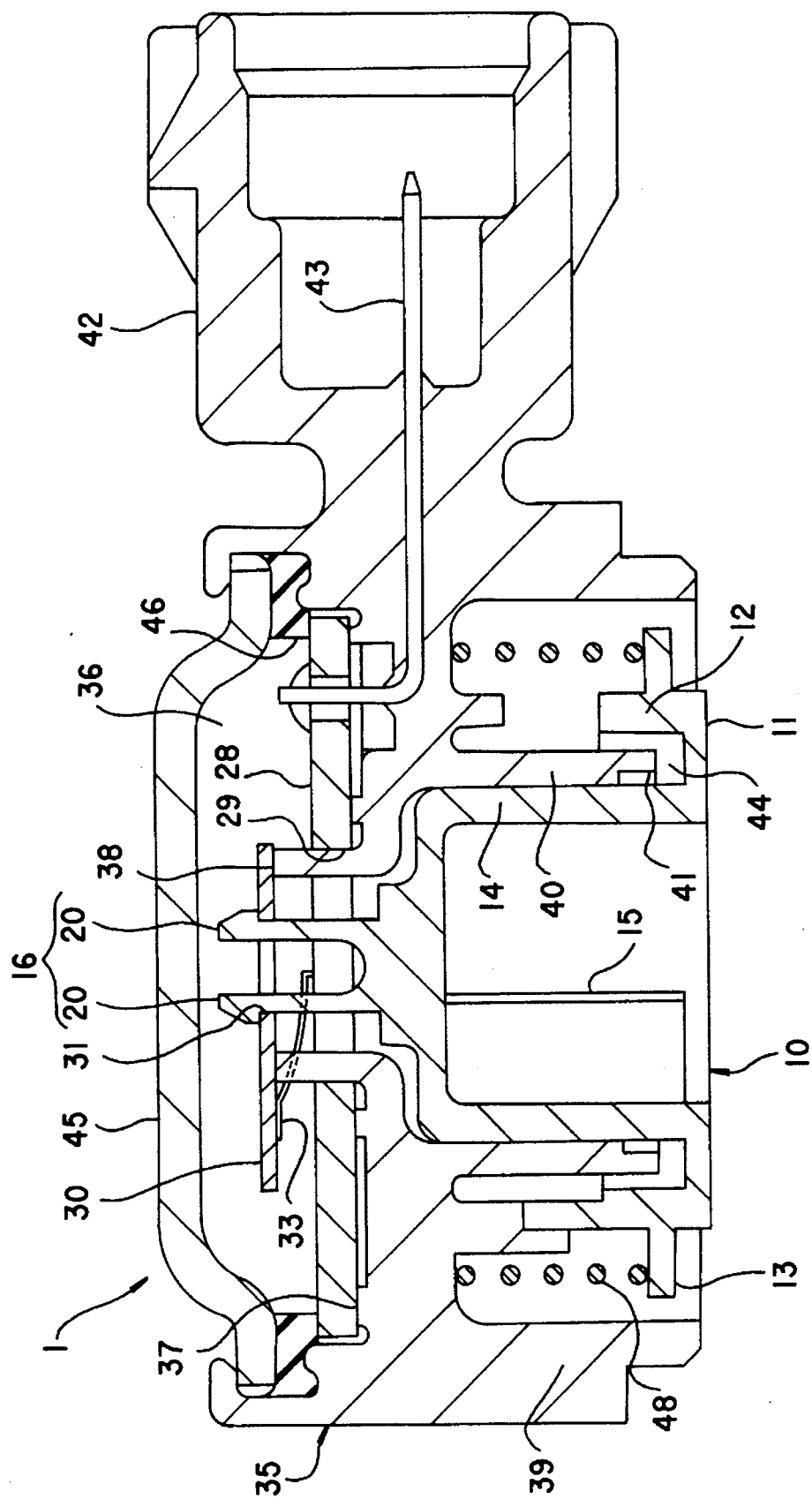
FIG. 4 is a vertical cross sectional view of a throttle valve opening degree sensor in a preferred embodiment according to the present invention.

The rotor 10 is made of a synthetic resin material in this example, has a connection portion 15 capable of connecting the throttle shaft 61 of the throttle valve, and has the cylindrical covering portion 11 and an annular portion 13 formed at the outer end face (right end in FIG. 4).

The cylindrical covering portion 11 has an outer circumferential cylindrical body 12 formed coaxially at a predetermined distance to the outer circumferential surface of the main body 14 of the rotor 10 and it has a substantially U-shaped vertical cross section. The annular portion 13 is formed as a flange protruding from the outer circumferential surface of the outer circumferential cylindrical member 12 in a direction perpendicular to the axial line of the rotor shaft 10. Further, an elastic engaging portion 16 is also disposed to one end of the rotor shaft 10 for engaging the rotor 30.

The elastic engaging portion 16 comprises four engagements 20 extending in the axial direction of the rotor shaft 10 and opposed in parallel with each other by way of splitted grooves 17a and 17b crossing to each other.

Figure 5:
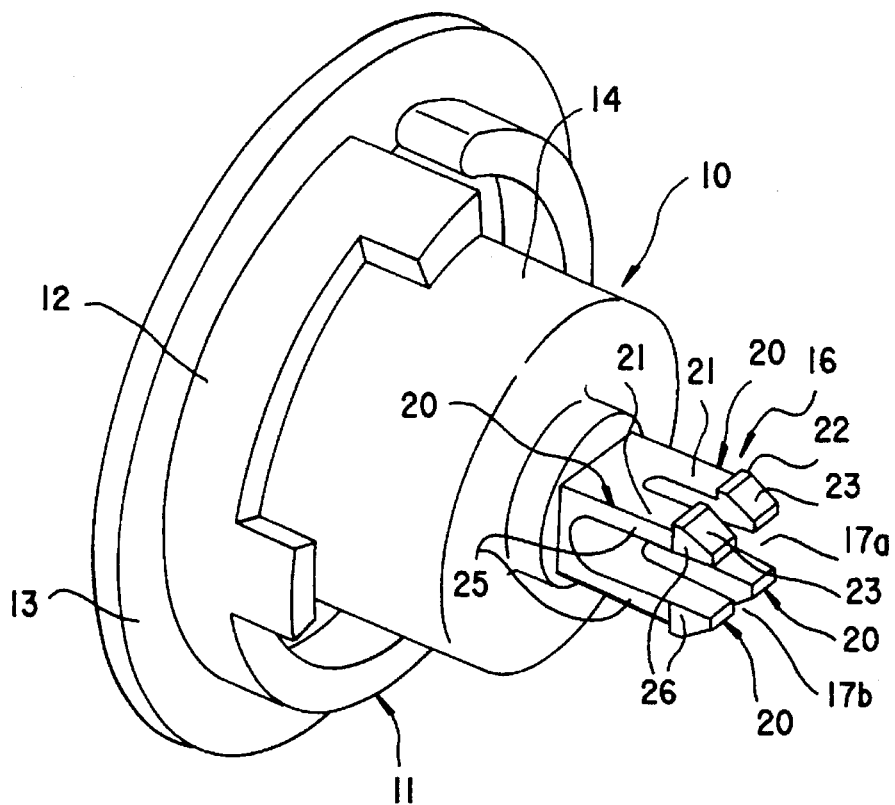
FIG. 5 is a perspective view of a rotor shaft.
Figure 6:
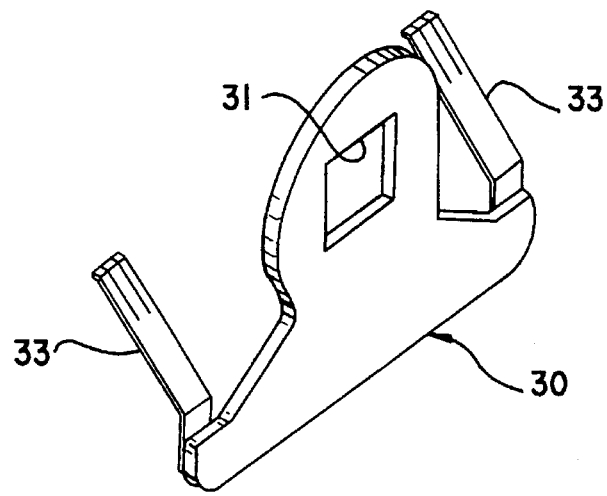
FIG. 6 is a perspective view of a rotor.

Each of the four engagements 20 has abutting faces 21, 25 at the outer periphery and each of the abutting faces 21, 25 has an elastic force in the direction perpendicular to each of the faces due to the elasticity inherent to the material per se. Each of the abutting faces 21, 25 has a square profile and is formed slightly greater than the outer circumference for the square engaging hole 31 to be described later. Each of the four engagements 20 has, at the top end of the abutting surface 21, a protrusion 22 protruding vertically and convergingly tapered surface 23 in FIG. 5, and a convergingly tapered surface 26 is formed at the top end of the abutting face 25.

The substrate 28 is made of a plate member of ceramics, glass cloth or epoxy resin and on one surface of which (upper surface in FIG. 4) is formed with an opening degree detection section for the throttle valve comprising a printed pattern. Further, at the center of the substrate 28, a fitting hole 29 is perforated for fitting the outer circumference of the rotor seat 38 to be described later to position the center of the opening degree detection section.

The rotor 30 is formed as a flat plate made of a synthetic resin material and, at the center of rotation, an engaging hole 31 for attaching the rotor shaft 10 is perforated for elastically fitting the elastic engaging portion 16. Then, at a predetermined position of the rotor 30, sliding contacts 33, 33 are secured so as to be elastically in contact with and sliding on the opening degree detection section.

The housing 35 is made of a synthetic resin material and comprises the substrate 28 and a housing chamber 36 for enhousing the rotor 30 and a bearing portion 40 for rotatably supporting the rotor shaft 10. A substrate locating portion 37 is disposed to the housing chamber 36 for locating and supporting the substrate 28. Further, at the central portion of the housing chamber 36, a rotor seat 38 is protruded in a cylindrical shape for rotatably and slidably supporting the lower surface (lower surface in FIG. 4, 7) of the rotor 30.

Further, a diametrically enlarged portion 41 enlarging the inner diameter is formed on the outer end of the bearing portion 40.

Then, a labyrinth-like gap 44 bent in a U-shaped vertical cross section is formed between the inner surface of the cylindrical covering portion 11 and the bearing portion 40 exposed to the basic portion 39 when the rotor shaft 10 is fitted into and rotatably supported by the bearing portion 40, and the annular portion 13 situates in such a manner as covering the outer circumference thereof.

Further, the rotor 30 is attached to the rotor shaft 10 with the engaging hole 31 of the rotor 30 being fitted to the top end of the elastic engaging portion 16 of the rotor shaft 10 protruding out of the rotor seat 38. Then, a returning spring 48 is interposed between the annular portion 13 of the rotor shaft 10 and the housing 35.

The returning spring 48 has a twisting spring resiliency and a compressive spring resiliency and rotationally biases the rotor shaft 10 in the returning direction and downwardly biases the rotor shaft 10 in FIG. 4. Thus, the lower surface of the rotor 30 is slidably brought into intimate contact with the rotor seat 38 by way of the rotor shaft 10.

Further, a connector portion 42 extends sideways from the housing 35, and a plurality of connector terminals 43 electrically connected with the opening degree detection section are disposed to the connector portion 42. Further, a cover 45 urges the substrate 28 by way of a packing 46 having rubbery elasticity on the substrate locating portion 37 and tightly closes the opening of the housing chamber 36.

In this embodiment, the rotor 30 is attached to the rotor shaft 10 by fitting the rotor shaft 10 to the bearing portion 40 of the housing 35 and externally fitting the engaging hole 31 of the rotor 30 at a predetermined attaching position to the elastic engaging portion 16 of the rotor shaft 10 protruding out of the rotor seat 38.

In this case, the tapered faces 23, 26 of each of the engagements 20 are at first urged by the circumferential edges of the engaging hole 31 and compressed elastically. Then, after the passage of the protrusion 22 through the engaging hole 31, each of the abutting faces 21 opens by the resiliency of the engagement 20 and abuts elastically to the circumferential edge of the engaging hole 31. On the other hand, after the passage of the tapered face 26 through the engaging hole 31, the abutting face 25 elastically abuts against other circumferential edge of the engaging hole 31.

This can align the axial line of the rotor shaft 10 with the center of rotation of the rotor 30 and determine the position for attaching angle of the rotor 30. Accordingly, the center of rotation and the relative attaching angle between the sliding contact 33 attached to the rotor 30 and the opening degree detection section of the substrate 28 are accurately determined.

On the other hand, each of the protrusions 22 engages the upper surface (upper surface in FIG. 4, 7) of the rotor 30, and makes the rotor into intimate contact on the rotor seat 38 by the downward resiliency of the return spring 48 in the axial direction. This can define the axial position of the rotor 30, accurately maintain the distance between the rotor 30 and the substrate 28, so that pressure of contact of the sliding contact 33 on the opening degree detection section can be maintained constant.

Description will be made to the operation of the throttle valve opening degree sensor 1.

Figure 9:
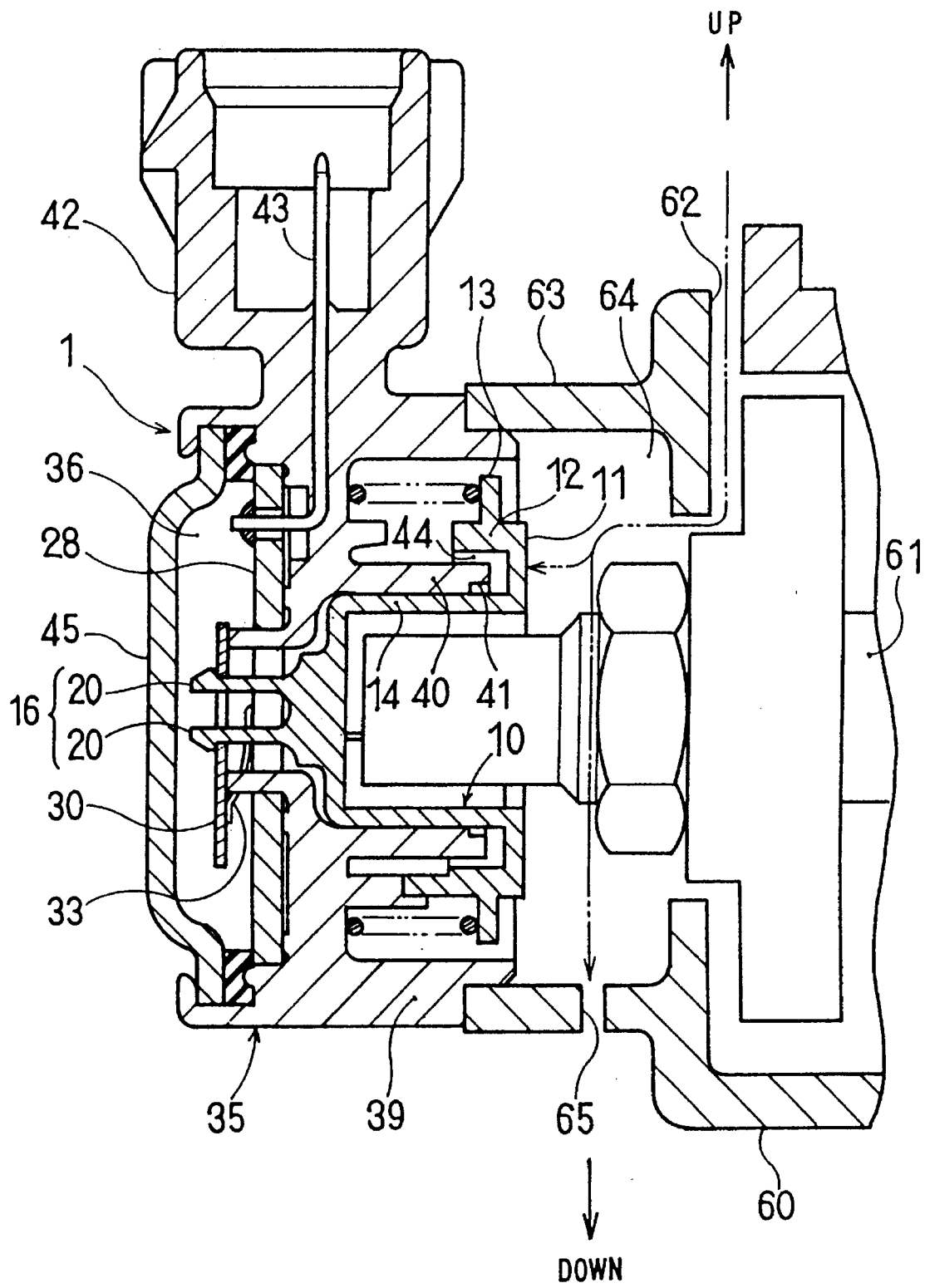
FIG. 9 is a cross sectional view illustrating a state of attaching the throttle valve opening degree sensor of the present invention to the throttle body.

As shown in FIG. 9, the throttle valve opening degree sensor 1 is attached at the base portion 39 to the sensor attaching portion 63 of the throttle valve 60 in an intimate contact, and the rotor shaft 10 is connected by way of the connection portion 15 to the throttle shaft 61 in a manner capable of interlocking therewith. In this case, the outer end face of the cylindrical covering portion 11 and the outer side face of the annular portion 13 of the rotor shaft 10 are opposed to the space 64 at the inside of the sensor attaching portion 63.

Then, obstacles such as water and dusts intruding from the recessed groove 62 are discharged as shown by dotted chain arrows through the space 64 from a drain aperture 65 to the outside. The recessed groove 62 opens upwardly and the drain aperture 65 opens downwardly. In the space 64, a portion of the obstacles deposits on the outer end face of the cylindrical covering portion 11 and on the outer side face of the annular portion 13 to prevent the obstacles from depositing to the bearing portion 40. Further, obstacles (particularly floating dusts, humidity, etc.) going around from the outside of the annular portion 13 to the inner side of the substrate 39 are inhibited from intruding to the outer end face of the bearing portion 40 by the labyrinth-like gap 44.

Accordingly, with the constitutions described above, obstacles are prevented from intruding and depositing to the bearing portion 40 to prevent increase of the rotational resistance of the rotor shaft 10. Further, obstacles deposited to the annular portion 13 scattered outwardly by the centrifugal force caused by the rotation of the rotor shaft 10 and discharged through the drain aperture 65. Further, the non-contact rotation at the labyrinth-shaped gap 44 does not increase the rotational resistance of the rotor shaft 10 thereby enabling to cover the outer end face of the shaft bearing portion 40 for a long period of time.

Further, the present invention is not limited to the foregoing explanations and illustrated embodiments but can be changed into various embodiments within a scope not departing from the technical idea of the invention. For instance, it may suffice that the outer circumference of the elastic engaging portion 16 is square or rectangular. Further, the protrusion may be disposed also on the abutting surface 26. In addition, the bearing portion may be formed separately from the housing to attain similar function and effect.

What is claimed is:

1. A throttle valve opening degree sensor comprising:

a rotor shaft capable of interlocking with a throttle valve operationally connected to a throttle body, a substrate having an opening degree detection section for the throttle valve, a rotor attached to said rotor shaft and having sliding contacts sliding on said opening degree detection section, and a housing having a housing chamber for housing said substrate, a bearing portion for rotatably supporting said rotor shaft and a base portion attached to said throttle body, wherein said rotor shaft has a cylindrical covering portion having an outer circumferential cylindrical body at an outer end, said cylindrical covering portion covering the outer end of said bearing portion exposed to the base portion of said housing and having an elastic engaging portion having cross-like splitted grooves at a top end and a square outer periphery, and said rotor has a square engaging hole for fitting said elastic engaging portion, said elastic engaging portion being fitted to and elastically abutted against said engaging hole thereby securing said rotor to said rotor shaft wherein a portion of the top end of the elastic engaging portion protrudes in a direction of said square engaging hole.

2. A throttle valve opening degree sensor comprising:

a substrate having an opening degree detection section for a throttle valve, a rotor shaft capable of interlocking with said throttle valve, a rotor attached to said rotor shaft and having sliding contacts sliding on said opening degree detection section, and a housing for housing said substrate and rotatably supporting said rotor shaft, wherein said rotor shaft has an elastic engaging portion having cross-like splitted grooves at a top end and having a square outer periphery, said rotor has a square engaging hole for fitting said elastic engaging portion, said elastic engaging portion being fitted into, elastically abutted against and secured to said engaging hole.

3. A throttle valve opening degree sensor as defined in claim 1 or 2, wherein the housing has a rotor seat rotatably and slidably supporting one surface of said rotor and the rotor shaft is biased in one axial direction thereby making said rotor slidably into intimate contact in a direction of said rotor seat such that in an attached position movement in the one axial direction is fixed.

4. A throttle valve opening degree sensor as defined in claim 1 to 2, wherein the housing has a rotor seat for rotatably supporting one surface of the rotor, and a rotor shaft is rotationally biased in a direction of closing the throttle valve by a return spring, and biased in a axial direction by said return spring thereby causing said rotor slidably in intimate contact with said rotor seat.

5. A throttle valve opening degree sensor as defined in claim 1, wherein a gap having a bent cross section is provided between the cylindrical covering portion and an outer end of the bearing portion.

6. A throttle valve opening degree sensor as defined in claim 1, wherein an outer end of the bearing portion is opposed by way of a gap having a substantially U-shaped cross section to the cylindrical covering portion of the rotor shaft.

7. A throttle valve opening degree as defined in claim 1, wherein an annular portion is protruded from an outer circumferential surface of the cylindrical covering portion in a direction perpendicular to an axial line thereof.

* * * * *